(12) United States Patent
Wang

(10) Patent No.: US 10,091,471 B2
(45) Date of Patent: Oct. 2, 2018

(54) DISPLAY PANEL, DISPLAY DEVICE AS WELL AS CONTROL METHOD AND PREPARATION METHOD THEREOF

(71) Applicant: Boe Technology Group Co., Ltd., Beijing (CN)

(72) Inventor: Xuefei Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/038,151

(22) PCT Filed: Oct. 13, 2015

(86) PCT No.: PCT/CN2015/091820
§ 371 (c)(1),
(2) Date: May 20, 2016

(87) PCT Pub. No.: WO2016/206233
PCT Pub. Date: Dec. 29, 2016

(65) Prior Publication Data
US 2017/0180687 A1    Jun. 22, 2017

(30) Foreign Application Priority Data

Jun. 24, 2015    (CN) .......................... 2015 1 0352036

(51) Int. Cl.
*H04N 9/31* (2006.01)
*G02B 26/08* (2006.01)
(Continued)

(52) U.S. Cl.
CPC .......... *H04N 9/3123* (2013.01); *G02B 5/003* (2013.01); *G02B 5/201* (2013.01); *G02B 6/0011* (2013.01);
(Continued)

(58) Field of Classification Search
CPC .... H04N 9/3123; H04N 9/3105; G02B 5/003; G02B 5/201; G02B 5/0011; G02B 5/0833; G02B 5/3105
See application file for complete search history.

(56) References Cited

U.S. PATENT DOCUMENTS

2003/0016335 A1* 1/2003 Penn .................. G02B 26/0841
353/31
2005/0162341 A1* 7/2005 Wada ....................... G09G 3/20
345/32
(Continued)

FOREIGN PATENT DOCUMENTS

CN    1323997    11/2001
CN    1590793    11/2005
(Continued)

OTHER PUBLICATIONS

International Search Report and Written Opinion from PCT/CN2015/0091820 dated Mar. 23, 2016.
(Continued)

*Primary Examiner* — Michael Teitelbaum

(57) ABSTRACT

A display panel, a display device as well as a control method and preparation method thereof. The display panel comprises: a filter provided with a light transmission part and a non-light transmission part corresponding to each pixel; a micro mirror array assembly comprising a substrate and a micro mirror array arranged on the substrate, the micro mirror array being provided with at least one micro mirror corresponding to each pixel; wherein mirror surfaces of the micro mirrors of the micro mirror array are arranged to substantially face towards the filter so as to enable light rays reflected by the micro mirrors to be emitted to the filter, and rotation of each of the micro mirrors on the substrate is controlled so as to enable the reflected light rays to be
(Continued)

controllably reflected to the light transmission part and/or the non-light transmission part of the corresponding pixel.

25 Claims, 5 Drawing Sheets

(51) Int. Cl.
    *G02B 5/20*     (2006.01)
    *G02B 6/00*     (2006.01)
    *G02B 5/00*     (2006.01)
    *F21V 8/00*     (2006.01)

(52) U.S. Cl.
    CPC ....... G02B 26/0833 (2013.01); H04N 9/3105 (2013.01)

(56) References Cited

U.S. PATENT DOCUMENTS

| | | | |
|---|---|---|---|
| 2007/0132922 A1 | 6/2007 | Lee | |
| 2008/0062359 A1* | 3/2008 | Inaba | G02B 5/285 |
| | | | 349/105 |
| 2013/0170012 A1* | 7/2013 | Ellis-Monaghan | G02B 5/201 |
| | | | 359/291 |

FOREIGN PATENT DOCUMENTS

| | | |
|---|---|---|
| CN | 101424768 | 5/2009 |
| CN | 101923837 | 12/2010 |
| CN | 103135307 | 6/2013 |
| CN | 104880522 | 9/2015 |
| JP | 2003015123 | 1/2003 |
| JP | 2006003718 | 1/2006 |
| JP | 2008209779 | 9/2008 |

OTHER PUBLICATIONS

Office action from China Application No. 201510352036.0 dated Sep. 30, 2016.
Office action from Chinese Application No. 201510352036.0 dated Mar. 20, 2017.
Third Office Action from China Application No. 201510352036.0 dated Aug. 11, 2017.
Fourth Office Action from China Application No. 201510352036.0 dated Feb. 8, 2018.

* cited by examiner

DISPLAY PANEL, DISPLAY DEVICE AS WELL AS CONTROL METHOD AND PREPARATION METHOD THEREOF

RELATED APPLICATIONS

The present application is the U.S. national phase entry of PCT/CN2015/091820, with an international filing date of Oct. 13, 2015, which claims the benefit of Chinese Patent Application No. 201510352036.0, filed on Jun. 24, 2015, the entire disclosure of which is incorporated herein by reference.

TECHNICAL FIELD

The present disclosure belongs to the field of display technology, and relates to a display panel for carrying out display based on a micro mirror array and a filter, a preparation method of the display panel and a display device comprising the display panel, as well as a control method of the display device.

BACKGROUND

With the rapid development of the display technology, various display technologies are constantly emerging. However, the current mainstream display technology is still carried out based on the liquid crystal panel. In the liquid crystal display technology, at least two layers of polarizers are required inevitably; hence, the light transmission rate and utilization efficiency are restrained, which is not beneficial to reduce the power consumption.

In the technical field of Micro-Electro-Mechanical System (MEMS), a micro mirror array assembly is a controllable micro mechanical structure system constituted by semiconductor materials or/and other materials (such as Si, PDMS and the like) suitable for micromachining. In general cases, the micro mirror array assembly integrates electric, mechanical and optical (or thermal, piezoelectric etc.) sensors, executors and signal sampling and control IC into a chip system, for example, the digital micro mirror device (DMD) chip developed by Texas Instruments.

A plurality of micro mirrors of the micro mirror array assembly can be arranged in a two-dimensional array to form a micro mirror array, wherein the micro mirror units in the micro mirror array assembly for example can be MEMS reflective micro mirrors, the basic principle of which is to enable the movable micro mirror surfaces to be rotated or translated through electrostatic (or magnetic) effect, thereby changing the propagation direction or phase of the input light.

The digital light procession (DLP) technology needs to perform digital processing to the image signal firstly, and then project the light out. It is widely used in the field of projection display technology in combination with the application of the DMD chip. Specifically, the DLP projection technology applies the DMD chip as the main key processing components so as to carry out the digital optical processing; the principle thereof is passing the cold light emitted from a light source such as a bulb through a condensing lens, homogenizing the light through a rod, passing the processed light through a color wheel, dividing the light into three colors of RGB, then projecting the colors on the DMD chip via the lens, and finally performing reflection and imaging on the projection screen through the projection lens. Therefore, it is not disclosed in the prior art at all to form a display panel based on the micro mirror array assembly.

SUMMARY

An object of the present disclosure lies in proposing a display panel formed based on a micro mirror array assembly and a filter.

In order to achieve the above object or other objects, the present disclosure provides the following technical solutions.

According to an aspect of the present disclosure, a display panel is provided, comprising:

a filter provided with a light transmission part and a non-light transmission part corresponding to each pixel; and a micro mirror array assembly comprising a substrate and a micro mirror array arranged on the substrate, the micro mirror array being provided with at least one micro mirror corresponding to each pixel;

wherein mirror surfaces of the micro mirrors of the micro mirror array are arranged to substantially face towards the filter so as to enable light rays reflected by the micro mirrors to be emitted to the filter, and rotation of each of the micro mirrors on the substrate is controlled so as to enable the reflected light rays to be controllably reflected to the light transmission part and/or the non-light transmission part of the corresponding pixel.

According to an embodiment, the display panel further comprises:

a light source; and a light guide plate for converting the light source into a surface light source so as to provide incident light rays with substantially same incident angles for the micro mirror array;

wherein the reflected light rays at least partially penetrate the light guide plate.

Specifically, the light guide plate can be a reflection type light guide plate.

According to an embodiment, the light guide plate is arranged between the filter and the micro mirror array assembly, or arranged at a side of the filter facing away from the micro mirror array assembly.

According to an embodiment, the filter is a color filter, the light transmission part at least comprises a first sub-pixel, a second sub-pixel and a third sub-pixel, the non-light transmission part is a black matrix area of a black matrix.

According to an embodiment, in the color filter, two adjacent sub-pixels of the first sub-pixel, the second sub-pixel and the third sub-pixel share one black matrix area, or each sub-pixel of the first sub-pixel, the second sub-pixel and the third sub-pixel is provided with one black matrix area.

Specifically, the first sub-pixel, the second sub-pixel and the third sub-pixel are arranged in the same layer as the black matrix area or in different layers from the black matrix area.

According to an embodiment, in the micro mirror array assembly, at least three micro mirrors are arranged corresponding to each pixel unit, the three micro mirrors are arranged corresponding to the first sub-pixel, the second sub-pixel and the third sub-pixel respectively.

According to an embodiment, the reflected light rays are all reflected towards the non-light transmission part so as to display a dark picture.

According to an embodiment, the reflected light rays are at least partially reflected towards the light transmission part so as to display a bright picture.

According to an embodiment, a ratio of an area that the light rays reflected by each of the micro mirrors are reflected to the light transmission part and an area that the light rays reflected by each of the micro mirrors are reflected to the non-light transmission part is controlled so as to control a gray scale of the bright picture.

According to an embodiment, a ratio of time that the light rays reflected by each of the micro mirrors are reflected to the light transmission part and time that the light rays reflected by each of the micro mirrors are reflected to the non-light transmission part within certain time is controlled so as to control a gray scale of the bright picture.

Specifically, the ratio of time that the light rays reflected by each of the micro mirrors are reflected to the light transmission part and time that the light rays reflected by each of the micro mirrors are reflected to the non-light transmission part within certain time is controlled through a pulse width modulation control signal.

According to an embodiment, the micro mirror array assembly further comprises:

a driving circuit layer arranged on the substrate for controlling rotation of the micro mirrors.

According to an embodiment, rotations of the three micro mirrors are controlled respectively so as to control a ratio of light amount of light rays reflected by a first one of the three micro mirrors to the first sub-pixel, light amount of light rays reflected by a second one of the three micro mirrors to the second sub-pixel and light amount of light rays reflected by a third one of the three micro mirrors to the third sub-pixel respectively.

According to another aspect of the present disclosure, a display device is provided, comprising any one of display panels stated above.

According to a further aspect of the present disclosure, a control method of a display device is provided, wherein the display panel of the display device comprises:

a filter provided with a light transmission part and a non-light transmission part corresponding to each pixel; and a micro mirror array assembly comprising a substrate and a micro mirror array arranged on the substrate, the micro mirror array being provided with at least one micro mirror corresponding to each pixel;

wherein mirror surfaces of the micro mirrors of the micro mirror array are arranged to substantially face towards the filter so as to enable light rays reflected by the micro mirrors to be emitted to the filter;

wherein the control method comprises:

controlling rotation of each of the micro mirrors on the substrate so as to enable the reflected light rays to be controllably reflected to the light transmission part and/or the non-light transmission part of the corresponding pixel.

According to an embodiment, the rotation of each of the micro mirrors is controlled to enable the reflected light rays to be all reflected towards the non-light transmission part so as to display a dark picture.

According to an embodiment, the rotation of each of the micro mirrors is controlled to enable the reflected light rays to be at least partially reflected towards the light transmission part so as to display a bright picture.

According to an embodiment, a ratio of an area that the light rays reflected by each of the micro mirrors are reflected to the light transmission part and an area that the light rays reflected by each of the micro mirrors are reflected to the non-light transmission part is controlled so as to control a gray scale of the bright picture.

According to an embodiment, a ratio of time that the light rays reflected by each of the micro mirrors are reflected to the light transmission part and time that the light rays reflected by each of the micro mirrors are reflected to the non-light transmission part within certain time is controlled so as to control a gray scale of the bright picture.

Specifically, the ratio of time that the light rays reflected by each of the micro mirrors are reflected to the light transmission part and time that the light rays reflected by each of the micro mirrors are reflected to the non-light transmission part within certain time is controlled through a pulse width modulation control signal.

According to an embodiment, the filter is a color filter, the light transmission part at least comprises a first sub-pixel, a second sub-pixel and a third sub-pixel, the non-light transmission part is a black matrix area of a black matrix;

in the micro mirror array assembly, three micro mirrors are arranged corresponding to each pixel unit, the three micro mirrors are arranged corresponding to the first sub-pixel, the second sub-pixel and the third sub-pixel respectively.

in the control method, rotations of the three micro mirrors are controlled respectively so as to control a ratio of light amount of light rays reflected by the three micro mirrors to the first sub-pixel, light amount of light rays reflected by the three micro mirrors to the second sub-pixel and light amount of light rays reflected by the three micro mirrors to the third sub-pixel respectively.

According to yet another aspect of the present disclosure, a method of preparing a display panel stated above, comprising the steps of:

forming a substrate of the micro mirror array assembly;

forming a micro mirror array comprising a plurality of rotatable micro mirrors on the substrate;

forming a filter; and assembling at least the micro mirror array assembly and the filter to form a display panel.

According to an embodiment, the method of preparing a display panel comprises: forming a light guide plate; the micro mirror array assembly, the light guide plate and the filter are at least arranged successively from down to up to form a display panel by assembly.

According to an embodiment, the filter is a color filter; in the step of forming the filter, at least a first sub-pixel, a second sub-pixel and a third sub-pixel as well as a black matrix area are formed corresponding to each pixel.

The present disclosure forms a display panel based on a micro mirror array assembly and a filter, which has a simple structure, so as to be capable of reducing the use of polarizers, increasing light transmission rate and light utilization efficiency, and having low power consumption.

BRIEF DESCRIPTION OF THE DRAWINGS

The above and other objects as well as advantages of the present disclosure will be more complete and clear in the following detailed explanations in combination with the drawings, wherein the same or similar elements are represented by the same reference signs.

DETAILED DESCRIPTION

Figure 1:
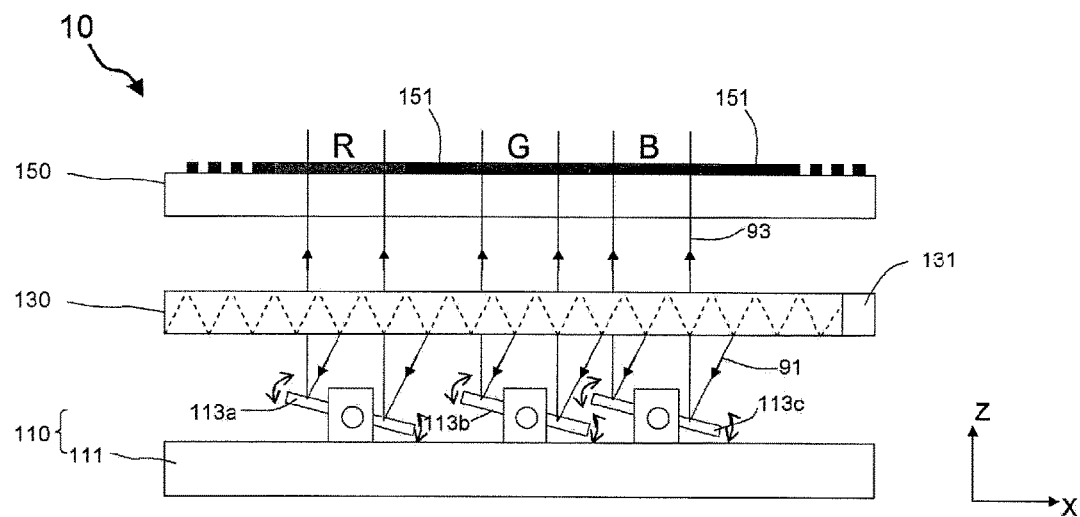
FIG. 1 is a schematic view of a basic structure of a display panel according to an embodiment.

What will be introduced below are some possible embodiments, which aim to provide a basic understanding of the present disclosure, rather than determine all key or crucial elements of the present disclosure or defining the claimed scope thereof. It can be easily understood that an ordinary skilled person in the art, without changing the essential spirit of the present disclosure, can put forth other implementations that are replaceable with each other based on the technical solutions of the present disclosure. Therefore, the following specific implementations and the drawings are only exemplary explanations to the technical solutions of the present disclosure, and should not be regarded as the entirety of the present disclosure or regarded as definitions or limitations to the technical solutions of the present disclosure.

In the following description, in order to describe clearly and concisely, not all of the multiple components of the display panel for carrying out the present disclosure are described in detail. The drawings only show multiple components in the display panel for enabling the ordinary skilled person in the art to carry out the disclosure completely. For the skilled person in the art, the display panel can further comprise many other components not shown in the drawings, and the operations of these components are all familiar and obvious.

Herein, the orientation terms such as "upper" and "lower" are defined with respect to the orientations of the placements of the display panel in the drawings. It should be understood that these directional terms are relative concepts, which are used for relative description and clarification, and can be changed correspondingly based on the change of the orientation of the placement of the display panel.

FIG. 1 shows a schematic view of a basic structure of a display panel according to an embodiment. In this embodiment, a display panel 10 basically comprises a micro mirror array assembly 110, a filter 150; in order to realize initiative display, a light guide plate 130 is further provided in this embodiment, and a light source 131 is arranged corresponding to the light guide plate; in this way, the display panel 10 of this embodiment provides a light source of initiative display.

In the following description, for the convenience of explaining the embodiments, a plane parallel to the filter is defined as an xy plane, wherein direction x is a direction in which the red (R) sub-pixel, the green (G) sub-pixel and the blue (B) sub-pixel are arranged successively, the direction y is a direction perpendicular to the direction x, and the direction z is a direction perpendicular to the filter.

As shown in FIG. 1, in this embodiment, the micro mirror array assembly 110 is an MEMS (Micro-Electro-Mechanical Systems) assembly, comprising an MEMS substrate 111, which can be made from a semiconductor material, and the specific material and size thereof are not restrictive; on the substrate 111, a plurality of MEMS reflection type micro mirrors (hereinafter referred to as "micro mirrors") 113 are arranged, each of which can rotate on the micro mirror array assembly. For example, the micro mirror rotates in the xz plane around the rotation axis in the arrow direction as shown in the figure. A driving circuit layer (not shown in the figure) can be arranged on the MEMS substrate 111. The driving circuit layer is used for controlling the rotation of the MEMS reflection type micro mirror, for example, controlling the specific rotation angle. The driving circuit layer can be prepared on the MEMS substrate 111 using the conventional semiconductor integrated circuit preparation process.

As shown in FIG. 1 further, in this embodiment, the light guide plate 130 is arranged between the micro mirror array assembly 110 and the filter 150, for providing a front light source for the micro mirror array assembly 110. Light rays 91 emitted from the light guide plate 130 to the micro mirror 113 can be emitted to the micro mirror directly in a substantially parallel manner, and the incident efficiency of the light is high. Specifically, the light guide plate 130, taking the example of a reflective light guide plate, receives linear light source from the light source 131, and then converts it into surface light source which is emitted uniformly from a side facing the micro mirror 113. Therefore, it is capable of providing relatively uniform light sources for a plurality of micro mirrors 113 simultaneously. The light rays 93 reflected from the micro mirror 113 substantially can pass through the light guide plate 130 at least partially so as to be further emitted to the filter 150. The light source 131 can be, but is not limited to, an LED or lamp tube light source, and the light source 131 can be arranged at the left and the right simultaneously in other instances.

It should be noted that in the light guide plate 130, the light rays emitted from the light source 131 are substantially all reflected on a side of the light guide plate 130 facing the filter 150 as shown in FIG. 1, but can at least partially penetrate a side of the light guide plate 130 facing the micro mirror array assembly 110 as shown in FIG. 1. Moreover, the light rays 93 reflected from the micro mirror 113 can partially penetrate the light guide plate 130, such as, for example, substantially penetrating the light guide plate 130. In a specific embodiment, the light guide plate 130 can use the type of light guide plate disclosed in the prior art, and therefore not explained in detail herein. After the light rays emitted from the light source 131 enters the light guide plate of this embodiment, the upper surface is a reflecting surface relative to the light rays within the light guide plate, and the lower surface is an exit surface relative to the light rays within the light guide plate. Therefore, the light rays within the light guide plate of this embodiment can only be emitted from the lower surface substantially. Meanwhile, when the light rays 93 reflected from the micro mirror 113 are reflected at various angles, they substantially all pass through the light guide plate of this embodiment and are emitted to the filter 150, particularly being capable of penetrating the upper surface of the light guide plate of this embodiment. Therefore, the light guide plate of this embodiment can make the light rays emitted from the light source 131 to be reflected from the upper surface of the light guide plate 130 substantially and emitted from the lower surface of the light guide plate 130, and the light rays 93 reflected from the micro mirror 113 at least substantially penetrate the light guide plate 130 (including the upper surface of the light guide plate 130).

It should be understood that the light guide plate 130 is not limited to the light guide plate of the embodiment of the present disclosure. It can use other types of light guide plate. The skilled person in the art would understand that any type of light guide plate that can provide surface light sources with incident rays in parallel with each other for the micro mirror 113 and that the light rays 93 reflected from the micro mirror 113 can at least partially penetrate the light guide plate itself can be applied in the display panel 10 of the present disclosure.

As shown in FIG. 1 further, in this embodiment, the filter 150 is arranged above the light guide plate 130. The filter 150 of this embodiment is a color filter, thereby being capable of implementing color display function. Specifically, the light transmission part of the filter 150 at least comprises three sub-pixel modules, i.e., R sub-pixel, G sub-pixel and B sub-pixel, corresponding to each pixel, and the non-light transmission part of the filter 150 can be a black matrix (BM). Corresponding to each pixel, one or more BM areas 151 can be arranged. The light rays 93 reflected from the micro mirror 113 may possibly be emitted only to the light transmission part, and may also be emitted only to the non-light transmission part, or may be emitted to both the light transmission part and the non-light transmission part; specifically, the light rays 93 emitted to the R sub-pixel, the G sub-pixel or the B sub-pixel can filter out corresponding light components, and the light rays 93 emitted to the BM area 151 are substantially fully filtered out.

In the embodiment as shown in FIG. 1, corresponding to the R sub-pixel, the G sub-pixel and the B sub-pixel, three micro mirrors 113a, 113b, 113c are also arranged on the micro mirror array assembly 110 correspondingly; the micro mirror 113a is arranged corresponding to the R sub-pixel, and the light rays 93 reflected from the micro mirror 113a may be possibly emitted to the R sub-pixel and/or a corresponding BM area 151 thereof; the micro mirror 113b is arranged corresponding to the G sub-pixel, and the light rays 93 reflected from the micro mirror 113b may be possibly emitted to the G sub-pixel and/or a corresponding BM area 151 thereof. The micro mirror 113c is arranged corresponding to the B sub-pixel, and the light rays 93 reflected from the micro mirror 113c may be possibly emitted to the B sub-pixel and/or a corresponding BM area 151 thereof.

It should be understood that each pixel to which the light transmission part of the filter 150 corresponds is not limited to the above embodiments comprising the R sub-pixel, the G sub-pixel and the B sub-pixel, but it can be selected and determined based on the pixel arrangement manner of the filter. In other embodiments, for example, in the pixel arrangement manner of RGBG, each pixel to which the light transmission part of the filter 150 corresponds comprises the R sub-pixel, the G sub-pixel, the B sub-pixel and the G sub-pixel; in the pixel arrangement manner of RGBW, each pixel to which the light transmission part of the filter 150 corresponds comprises the R sub-pixel, the G sub-pixel, the B sub-pixel and the W sub-pixel. In the pixel arrangement manner of CMY, each pixel to which the light transmission part of the filter 150 corresponds comprises the C sub-pixel, the M sub-pixel and the Y sub-pixel, which, for brevity, will not be enumerated individually herein.

It would be understood that the light transmission part and the non-light transmission part in the filter 150 are defined relative to the light rays 93 reflected by the micro mirrors.

It should be further noted that FIG. 1 only shows a micro mirror 113 on the micro mirror array assembly 110 corresponding to one pixel unit, and also only shows the display principle of one pixel therein; the display panel 10 can comprises many similar pixels, and the arrangement of the display parts of other pixels is omitted in the figure. Moreover, the size of each pixel unit is not restrictive. It can be set based on the requirement of the specific display resolution. The size of the micro mirror 113 can be set based on the size of the pixel unit. The smaller the size of the micro mirror 113 is, the higher the resolution of the display panel can be set.

Figure 2:
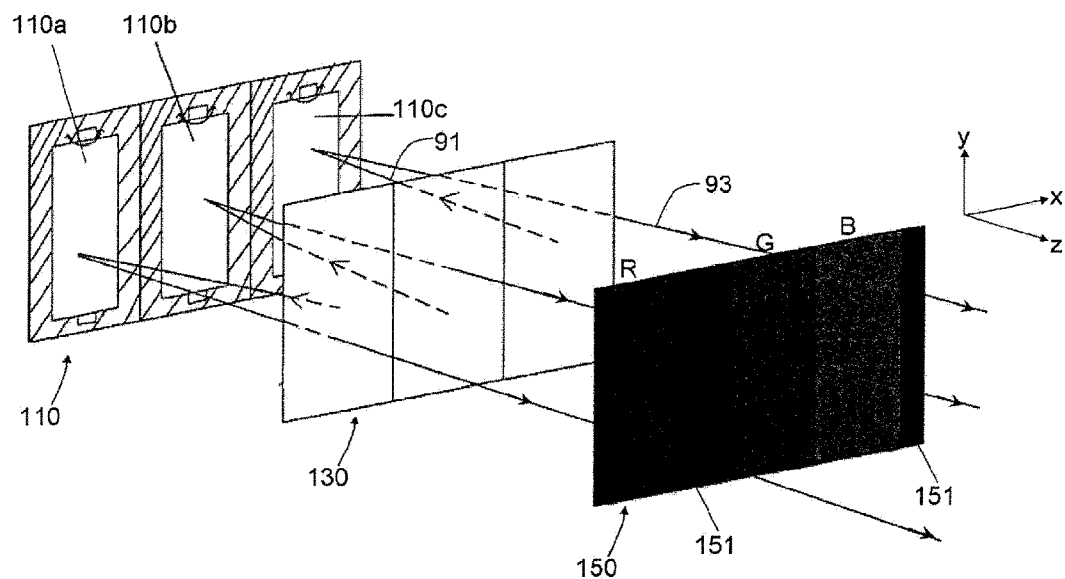
FIG. 2 is a schematic view of principle of the display panel as shown in FIG. 1 when displaying a bright picture.
Figure 3:
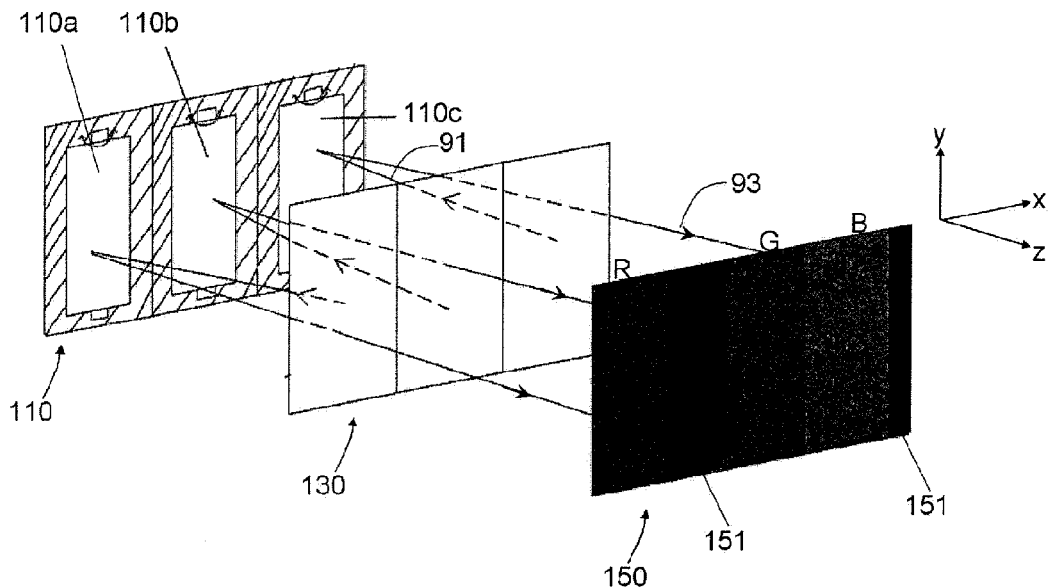
FIG. 3 is a schematic view of principle of the display panel as shown in FIG. 1 when displaying a dark picture.
Figure 4:
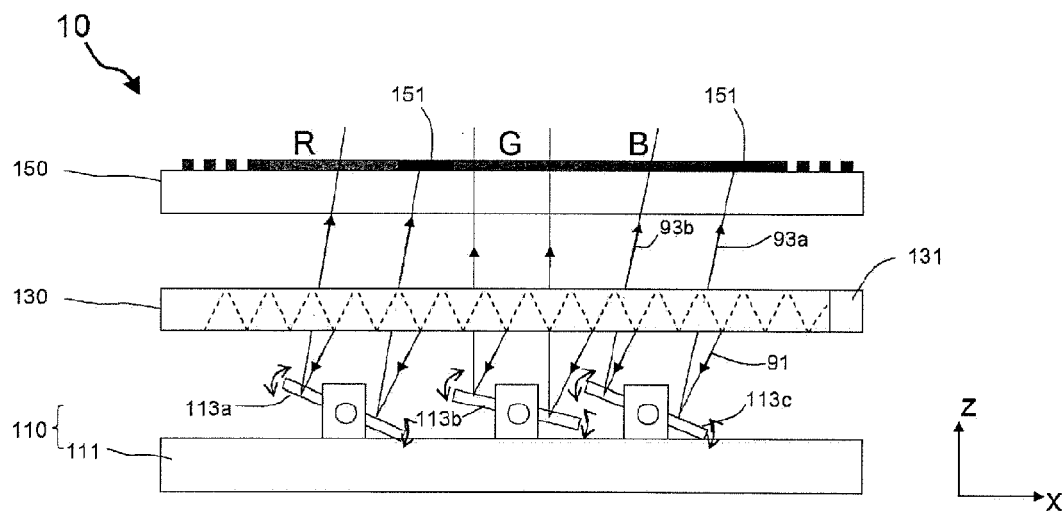
FIG. 4 is a schematic view of control principle of the display panel as shown in FIG. 1.

In the present disclosure, each micro mirror 113 is rotatably controllable; the control method principle of the display panel 10 in the embodiment will be disclosed in combination with FIG. 2 to FIG. 4.

FIG. 2 shows a schematic view of principle of the display panel in the embodiment as shown in FIG. 1 when displaying a bright picture. As shown in FIG. 2, after the light rays 91 inputted from the light guide plate 130 are reflected by the micro mirrors 113a, 113b and 113c. The light rays 93 reflected by them are at least partially reflected to their corresponding light transmission parts respectively (i.e., reflected to the R sub-pixel, the G sub-pixel and the B sub-pixel respectively). Thus, each pixel can filter corresponding light component to form a corresponding color display of the pixel. From the perspective of each pixel, a bright picture can be displayed.

FIG. 3 is a schematic view of principle of the display panel in the embodiment as shown in FIG. 1 when displaying a dark picture. As shown in FIG. 3, after the light rays 91 inputted from the light guide plate 130 are reflected by the micro mirrors 113a, 113b and 113c, the light rays 93 reflected by them are all reflected to the non-light transmission part (i.e., all reflected to one or more BM areas 151). Thus, no light rays penetrates each pixel, and a dark display of the pixel is formed. From the perspective of each pixel, a dark picture can be displayed.

FIG. 4 shows a schematic view of control principles of the display panel in the embodiment as shown in FIG. 1. When the bright color display as shown in FIG. 2 is formed, on the one hand, the gray scale of each pixel needs to be controlled; on the other hand, the display color of each pixel needs to be controlled. As shown in FIG. 4, the micro mirrors 113a, 113b and 113c can rotate relative to the MEMS substrate 111 where they locate, and the rotation angles are completely controllable. Hence, the angles of the light rays 93a, 93b, 93c reflected by them are also controllable; thus it can be determined that the amount of light reflected to the transmission part (R sub-pixel, G sub-pixel and B sub-pixel) and the non-light transmission part (BM part 151) of the filter 150 can be controlled proportionally.

In order to control the gray scale, in one instance, taking the micro mirror 113c as an example, after the incident light rays 91 are reflected by the micro mirror 113c, a part of the reflected light rays 93a are reflected to the BM area 151, and another part of the reflected light rays 93b are reflected to the B sub-pixel; because the rotation angle of the micro mirror 113c is controllable, when the rotation angle of the micro mirror 113c changes, the area that the light ray 93a is reflected on the BM area 151 (i.e., the irradiation area of the reflected light ray 93a), and the area that the light ray 93b is reflected on the B sub-pixel (i.e., the irradiation area of the reflected light ray 93b) also change simultaneously. The angles of the reflected light rays are controlled by controlling the rotation angles, so the ratio of the reflected light ray 93a and the reflected light ray 93b can be controlled, namely, a ratio of the area of the BM area 151 irradiated by the reflected light ray 93*a* and the area of the B sub-pixel irradiated by the reflected light ray 93*b* can be substantially controlled, and in turn, the light transmission amount of each sub-pixel, even of each pixel, can be controlled, and thereby the gray scale of the bright picture can be controlled. For example, when the reflected light rays are all reflected light rays 93*a*, they correspond to the gray scale of the highest brightness level; with the decrease of the reflected light ray 93*a* and the increase of the reflected light ray 93*b*, the gray scale also changes accordingly.

Figure 5:
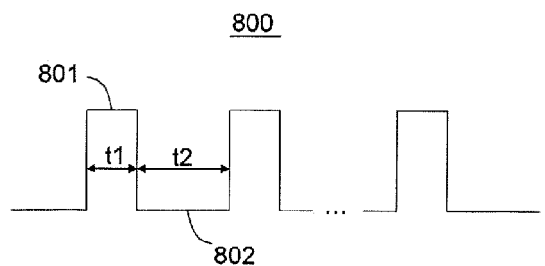
FIG. 5 is a waveform view of a control signal of an embodiment.

In another instance, the gray scale of the bright picture can be controlled by controlling a ratio of time that the light rays reflected by the micro mirror are reflected to the light transmission part and time that the light rays reflected by the micro mirror are reflected to the non-light transmission part within certain time. In an example, assume that the display frequency is 50 Hz, and the display period of each frame is 20 milliseconds. Combined with the control signal waveform view of the micro mirror as shown in FIG. 5, the time that the light rays 93 reflected by the micro mirror 113 to the BM area 151 and the time that the light rays 93 reflected by the micro mirror 113 to a certain sub-pixel within the display period of one frame are controlled based on the pulse width modulation (PWM) control signal 800. For example, at the time period t1 of a high level signal 801, the micro mirror 113 is controlled at a first angle where the reflected light rays 93 are substantially all reflected to the BM area 151; at the time period t2 of a low level signal 802, the micro mirror 113 is controlled at a second angle where the reflected light rays 93 are substantially all reflected to a certain sub-pixel. In this way, the micro mirror 113 rotates back and forth between the first angle and the second angle within the display period of one frame, thereby realizing gray scale control in the manner of strobe. It should be noted that (t1+t2) namely corresponds to the strobe frequency of the micro mirror 113. (t1+t2) is generally far less than the display period of one frame. Take the example that the display period of one frame is 20 milliseconds, (t1+t2) can be 1 millisecond or 2 milliseconds. Therefore, a ratio of the time for reflection to the light transmission part and the time for reflection to the non-light transmission part within the time of (t1+t2) can be controlled by controlling the ratio of t1 and t2 through the PWM control signal 800. It should be further noted that the response time of the rotation action of the micro mirror 113 is of the order of magnitude of microseconds, it can definitely perform multiple rotation actions within the display period of one frame to control the gray scale, and the viewers cannot feel such rotation action substantially.

It would be understood that based on different control modes of rotation of the micro mirror, other modes except for the PWM signal can be used to control the ratio of the time for reflection to the light transmission part and the time for reflection to the non-light transmission part. For example, when the storage data "0", "1" are used to control rotation of the micro mirror, the time for reflection to the light transmission part and the time for reflection to the non-light transmission part can be controlled by controlling the storage time of the storage data "0", "1" so as to control the time ratio thereof.

In order to control the display color, by controlling the rotation angles of the three micro mirrors 113*a*, 113*b* and 113*c*, the light amount reflected by each micro mirror to a corresponding sub-pixel (R sub-pixel, G sub-pixel and B sub-pixel) is controllable. Hence, a ratio of light amount of light rays reflected by the micro mirror 113*a* to the R sub-pixel, light amount of light rays reflected by the micro mirror 113*b* to the G sub-pixel and light amount of light rays reflected by the micro mirror 113*c* to the B sub-pixel respectively can be controlled. When the ratio is different, different color display of a corresponding pixel can be displayed.

As shown in FIG. 1 further, the R sub-pixel, the G sub-pixel and the B sub-pixel can be arranged in a same layer with respect to the black matrix area 151; in other embodiments, the R sub-pixel, the G sub-pixel and the B sub-pixel can also be arranged in different layers with respect to the black matrix area 151.

In one embodiment, the black matrix area 151 corresponds to two sub-pixels adjacent to it, so that two sub-pixels can share one black matrix area 151. For example, the R sub-pixel and the G sub-pixel share one black matrix area 151 between them, the B sub-pixel and the R sub-pixel share one black matrix area 151 between them. Hence, specifically, it can be realized by arranging one black matrix area 151 between every two sub-pixels. The filter 150 of this embodiment can make the black matrix area 151 to occupy a relatively small area, and thus the aperture ratio of the display panel 10 can be increased.

Figure 6:
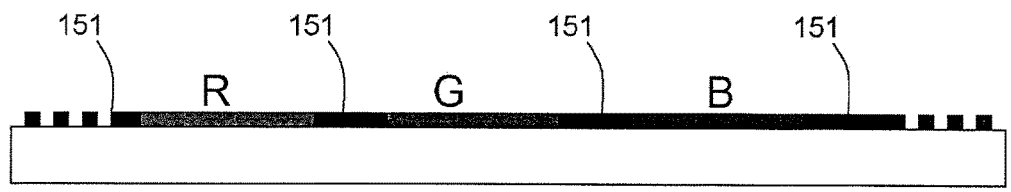
FIG. 6 is a schematic view of structure of a filter of another embodiment.

FIG. 6 shows a schematic view of structure of a filter of another embodiment. As shown in FIG. 6, the filter 250 is also provided with a R sub-pixel, a G sub-pixel, a B sub-pixel and a BM area 151 corresponding to each pixel, wherein one BM area is arranged corresponding to each sub-pixel. Specifically, the sub-pixels and the BM areas are arranged alternately in the manner as shown in FIG. 6.

Figure 7:
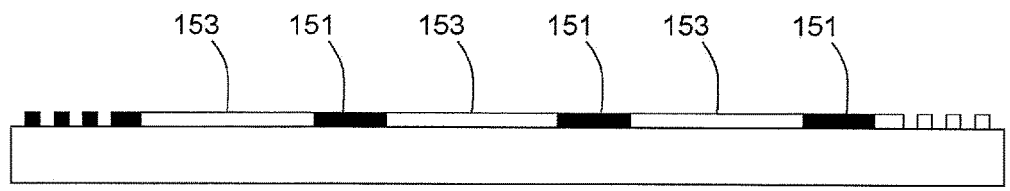
FIG. 7 is a schematic view of structure of a filter of a further embodiment.

FIG. 7 shows a schematic view of structure of a filter of a further embodiment. What is shown in the above embodiment is a color display scheme based on the MEMS reflection type micro mirror. In the embodiment as shown in FIG. 1, when the filter 150 is replaced with the filter 350 in the embodiment as shown in FIG. 7, black and white display can be realized. As shown in FIG. 7, the filter 350 comprises a light transmission part 153 and a non-light transmission part 151, which can be arranged corresponding to each pixel. The light transmission part 153 can transmit light rays 93 reflected by the micro mirror 113, while the non-light transmission part 151 blocks the light rays 93 reflected from the micro mirror 113, so as to realize black and white display, wherein the function of the non-light transmission part 151 is similar to that of the BM area 151. Each pixel can correspond to one light transmission part 153 and one non-light transmission part 151, and can also correspond to a plurality of light transmission parts 153 and a plurality of non-light transmission parts 151. The ratio of the area of the light transmission part 153 and the area of the non-light transmission part 151 is not restrictive.

When the filter 350 as shown in FIG. 7 is applied in a black and white display panel, and when each pixel can correspond to one light transmission part 153 and one non-light transmission part 151, correspondingly, on the micro mirror array assembly 110, each pixel can also only correspond to one micro mirror 113.

The display panel of the above embodiment, with a display principle completely different from the display panel of the prior art, and based on the control of the rotation angle of the micro mirror, can be realized easily. Moreover, it does not need to arrange a polarizer similar to that in the liquid crystal display at all, which increases the transmission rate and light utilization efficiency, and has low power consumption.

It should be noted that the specific rotation control to the micro mirror 110 in the above micro mirror array assembly 110 can be carried out through technologies such as the DLP technology, and can also be carried out for example through any control method disclosed in the doctoral dissertation titled "Research on sliding mode control of MEMS torsion micro mirror" authored by Chen Hui. Hence, the specific rotation control method of the micro mirror 110 is not limited to the above embodiments.

Figure 8:
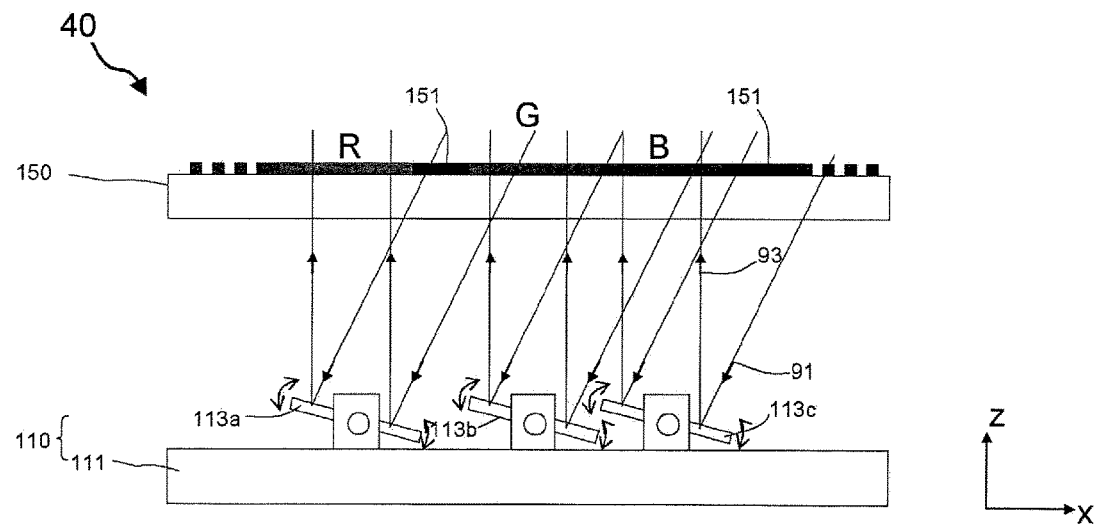
FIG. 8 is a schematic view of a basic structure of a display panel according to an embodiment.

FIG. 8 shows a schematic view of a basic structure of a display panel according to a further embodiment. Compared with the display panel 10 in the embodiment as shown in FIG. 1, the display panel 40 in the embodiment as shown in FIG. 8 omits the light guide plate 130 and the related component thereof. In this way, no initiative light source exists in the display panel 40, and the incident light rays 91 are incident to the micro mirror 113 from the outside of the display panel (for example, from the direction of the filter 150). Hence, the display panel 40 is suitable for application in an environment similar as daytime to perform image display. The incident light rays 91 can be light rays incident substantially in parallel with each other in the ambient light, e.g., sun light.

It would be understood that the skilled person in the art can apply various modifications of the micro mirror array assembly 110 and the filter 150 in the embodiment as shown in FIG. 1 into the display panel 40 in the embodiment as shown in FIG. 8 analogically.

Figure 9:
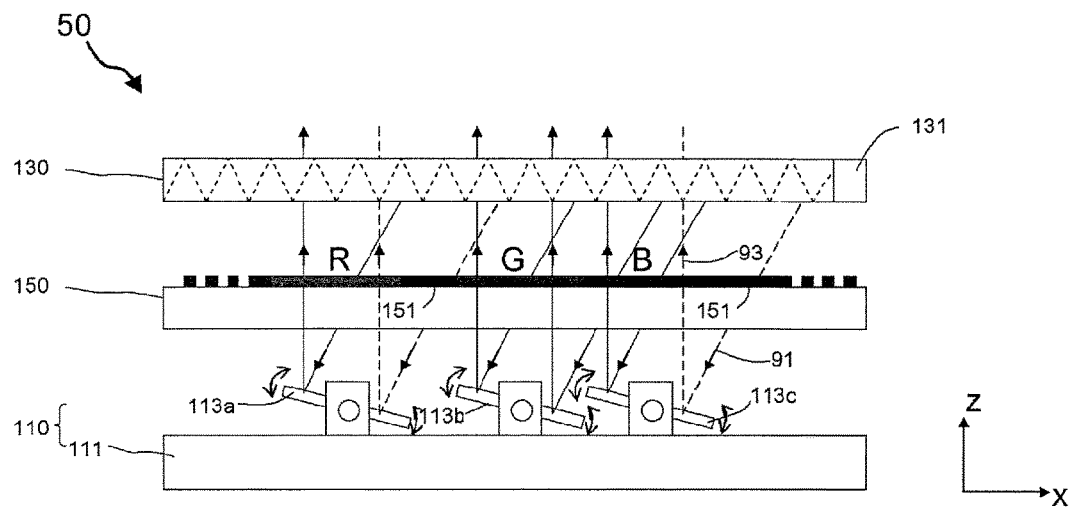
FIG. 9 is a schematic view of a basic structure of a display panel according to another embodiment.

FIG. 9 shows a schematic view of a basic structure of a display panel according to yet another embodiment. Compared with the display panel 10 in the embodiment as shown in FIG. 1, the display panel 50 in the embodiment as shown in FIG. 9 also comprises components such as a filter 150, a light guide plate 130 and a micro mirror array assembly 110 as shown in FIG. 1, and their working principles are substantially the same. Their main differences lies in the different arrangement position of the light guide plate 130. In the display panel 50 in the embodiment as shown in FIG. 9, the light guide plate 130 is arranged at a side of the filter 150 facing away from the micro mirror array assembly 110. Namely, the light guide plate 130, the filter 150 and the micro mirror array assembly 110 are arranged successively in the incident direction of the light rays. In this way, the light guide plate 130 provides uniform surface light sources. The incident light rays 93 are emitted to the micro mirror 113 after passing through the filter 150. The light rays reflected from the micro mirror 113 penetrate the light guide plate 130 after being filtered by the filter 150.

It would be understood that the skilled person in the art can apply various modifications of the micro mirror array assembly 110, the light guide plate 130 or the filter 150 in the embodiment as shown in FIG. 1 into the display panel 50 in the embodiment as shown in FIG. 9 analogically.

The display panel disclosed by the above embodiment can be provided without polarizer, and has a simple structure, which can be used for preparing various display devices.

It should be understood further that the display control method of the display panel 10 in the embodiment as shown in FIG. 1, particularly the control method to the micro mirrors, can be applied to the display panel in the embodiments as shown in FIG. 8 and FIG. 9 analogically.

Figure 10:
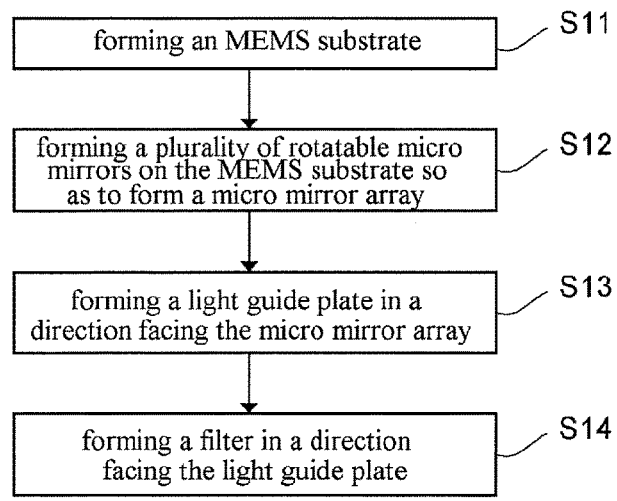
FIG. 10 is a flow chart of a preparation method of a display panel corresponding to an embodiment as shown in FIG. 1.

FIG. 10 shows a flow chart of a preparation method of a display panel corresponding to an embodiment as shown in FIG. 1. Mainly, the preparation method of the display panel 10 comprises the following steps.

Firstly, at step S11, a MEMS substrate 111 is formed. Specifically, various control circuits and corresponding structures, e.g., a driving circuit layer, for controlling rotation of the micro mirrors can be formed on the MEMS substrate 111.

Further, at step S12, a plurality of rotatable micro mirrors 113 are formed on the MEMS substrate 111, so as to form a micro mirror array. The micro mirrors 113 can be arranged on a rotational axis correspondingly, so as to be capable of rotating with respect to the MEMS substrate 111. The plurality of micro mirrors 113 can be arranged in a two dimensional array on the MEMS substrate 111 corresponding to the pixels.

In this way, the micro mirror array assembly 110 is substantially formed.

Further, at step S13, a light guide plate 130 is formed in a direction facing the micro mirror array.

Further, at step S14, a filter 150 is formed in a direction facing the light guide plate 130.

Thus, the display panel 10 can be formed by at least arranging the micro mirror array assembly 110, the light guide plate 130 and the filter 150 successively from down to up.

Figure 11:
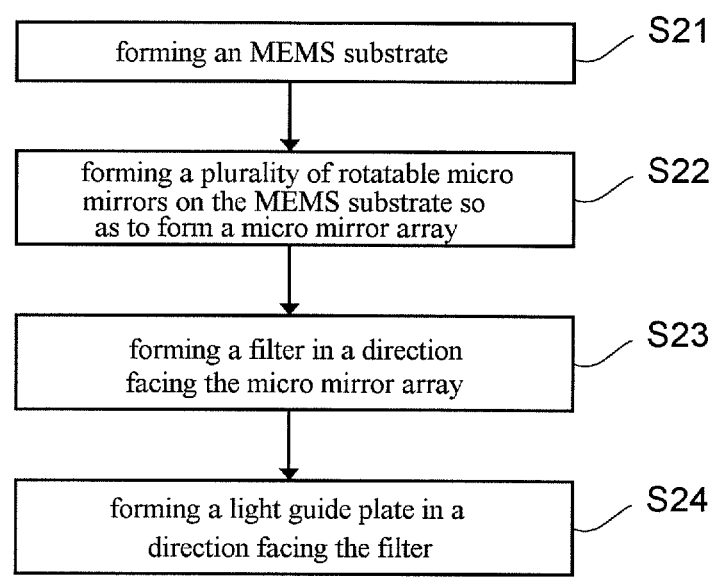
FIG. 11 is a flow chart of a preparation method of a display panel corresponding to an embodiment as shown in FIG. 9.

FIG. 11 shows a flow chart of a preparation method of a display panel corresponding to an embodiment as shown in FIG. 9. Mainly, the preparation method of the display panel 50 comprises the following steps.

Firstly, at step S21, an MEMS substrate 11 is formed. Specifically, various control circuits and corresponding structures, e.g., a driving circuit layer, for controlling rotation of the micro mirrors can be formed on the MEMS substrate 111.

Further, at step S22, a plurality of rotatable micro mirrors 113 are formed on the MEMS substrate 111, so as to form a micro mirror array. The micro mirrors 113 can be arranged on a rotational axis correspondingly, so as to be capable of rotating with respect to the MEMS substrate 111. The plurality of micro mirrors 113 can be arranged in a two dimensional array on the MEMS substrate 111 corresponding to the pixels.

In this way, the micro mirror array assembly 110 is substantially formed.

Further, at step S23, a filter 150 is formed in a direction facing the micro mirror array.

Further, at step S24, a light guide plate 130 is formed in a direction facing the filter 150.

Thus, the display panel 10 can be formed by at least arranging the micro mirror array assembly 110, the filter 150 and the light guide plate 130 successively from down to up.

It should be understood that in the above embodiments of the preparation method, the preparation orders of the micro mirror array assembly 110, the light guide plate 130 and the filter 150 are not limited to the order limitations in the embodiments as shown in FIG. 10 and FIG. 11. The micro mirror array assembly 110, the light guide plate 130 and the filter 150 can be manufactured in different orders or separatedly at the same time, and finally they are assembled to form the display panel.

The above examples mainly illustrate the display panel, the control method of a display device using the display panel and a preparation method of the display panel of the present disclosure. Although only some of the implementations of the present disclosure are described, the ordinary skilled person in the art should understand that the present disclosure can be carried out in many other forms without departing from the substance and scope thereof. For example, the light transmission part of the filter 150 comprises R, G, B, W sub-pixels, the corresponding pixel units correspond to four micro mirrors. Therefore, the illustrated examples and implementations are regarded as being schematic rather than being restrictive. In the case of not departing from the spirit and the scope of the present disclosure as defined by the attached claims, the present disclosure may encompass various modifications and replacements.

The invention claimed is:

1. A display panel, comprising:
   a filter provided with a light transmission part and a non-light transmission part corresponding to each pixel; and
   a micro mirror array assembly comprising a substrate and a micro mirror array arranged on the substrate, the micro mirror array being provided with at least one micro mirror corresponding to each pixel;
   wherein mirror surfaces of the micro mirrors of the micro mirror array are arranged to substantially face towards the filter so as to enable light rays reflected by the micro mirrors to be emitted to the filter, and rotation of each of the micro mirrors on the substrate is controlled so as to enable the reflected light rays to be controllably reflected to the light transmission part and/or the non-light transmission part of the corresponding pixel,
   wherein the display panel further comprises:
   a light source; and
   a light guide plate for converting the light source into a surface light source so as to provide incident light rays with substantially same incident angles for the micro mirror array;
   wherein the reflected light rays at least partially penetrate the light guide plate.

2. The display panel as claimed in claim 1, wherein in that the light guide plate is a reflection type light guide plate.

3. The display panel as claimed in claim 1, wherein the light guide plate is arranged between the filter and the micro mirror array assembly, or arranged at a side of the filter facing away from the micro mirror array assembly.

4. The display panel as claimed in claim 1, wherein the filter is a color filter, the light transmission part at least comprises a first sub-pixel, a second sub-pixel and a third sub-pixel, the non-light transmission part is a black matrix area of a black matrix.

5. The display panel as claimed in claim 4, wherein in the color filter, two adjacent sub-pixels of the first sub-pixel, the second sub-pixel and the third sub-pixel share one black matrix area, or each sub-pixel of the first sub-pixel, the second sub-pixel and the third sub-pixel is provided with one black matrix area.

6. The display panel as claimed in claim 4, wherein the first sub-pixel, the second sub-pixel and the third sub-pixel are arranged in the same layer as the black matrix area or in different layers from the black matrix area.

7. The display panel as claimed in claim 4, wherein in the micro mirror array assembly, at least three micro mirrors are arranged corresponding to each pixel unit, the three micro mirrors are arranged corresponding to the first sub-pixel, the second sub-pixel and the third sub-pixel respectively.

8. The display panel as claimed in claim 1, wherein the reflected light rays are all reflected towards the non-light transmission part so as to display a dark picture.

9. The display panel as claimed in claim 1, wherein the reflected light rays are at least partially reflected towards the light transmission part so as to display a bright picture.

10. The display panel as claimed in claim 9, wherein a ratio of an area that the light rays reflected by each of the micro mirrors are reflected to the light transmission part and an area that the light rays reflected by each of the micro mirrors are reflected to the non-light transmission part is controlled so as to control a gray scale of the bright picture.

11. The display panel as claimed in claim 9, wherein a ratio of time that the light rays reflected by each of the micro mirrors are reflected to the light transmission part and time that the light rays reflected by each of the micro mirrors are reflected to the non-light transmission part within certain time is controlled so as to control a gray scale of the bright picture.

12. The display panel as claimed in claim 11, wherein the ratio of time that the light rays reflected by each of the micro mirrors are reflected to the light transmission part and time that the light rays reflected by each of the micro mirrors are reflected to the non-light transmission part within certain time is controlled through a pulse width modulation control signal.

13. The display panel as claimed in claim 1, wherein the micro mirror array assembly further comprises:
   a driving circuit layer arranged on the substrate for controlling rotation of the micro mirrors.

14. The display panel as claimed in claim 7, wherein rotations of the three micro mirrors are controlled respectively so as to control a ratio of light amount of light rays reflected by a first one of the three micro mirrors to the first sub-pixel, light amount of light rays reflected by a second one of the three micro mirrors to the second sub-pixel and light amount of light rays reflected by a third one of the three micro mirrors to the third sub-pixel respectively.

15. A display device, comprising a display panel as claimed in claim 1.

16. A method of preparing a display panel as claimed in claim 1, comprising the steps of:
   forming a substrate of the micro mirror array assembly;
   forming a micro mirror array comprising a plurality of rotatable micro mirrors on the substrate;
   forming a filter; and
   assembling at least the micro mirror array assembly and the filter to form a display panel.

17. The method as claimed in claim 16, comprising: forming a light guide plate, wherein the micro mirror array assembly, the light guide plate and the filter are at least arranged successively from down to up to form a display panel by assembly.

18. The method as claimed in claim 16, wherein the filter is a color filter; in the step of forming the filter, at least a first sub-pixel, a second sub-pixel and a third sub-pixel as well as a black matrix area are formed corresponding to each pixel.

19. A control method of a display device, wherein the display panel of the display device comprises:
   a filter provided with a light transmission part and a non-light transmission part corresponding to each pixel; and
   a micro mirror array assembly comprising a substrate and a micro mirror array arranged on the substrate, the micro mirror array being provided with at least one micro mirror corresponding to each pixel;
   wherein mirror surfaces of the micro mirrors of the micro mirror array are arranged to substantially face towards the filter so as to enable light rays reflected by the micro mirrors to be emitted to the filter,
   wherein the display panel further comprises:
   a light source; and
   a light guide plate for converting the light source into a surface light source so as to provide incident light rays with substantially same incident angles for the micro mirror array;

wherein the reflected light rays at least partially penetrate the light guide plate;

wherein the control method comprises:

controlling rotation of each of the micro mirrors on the substrate so as to enable the reflected light rays to be controllably reflected to the light transmission part and/or the non-light transmission part of the corresponding pixel.

20. The control method as claimed in claim 19, wherein the rotation of each of the micro mirrors is controlled to enable the reflected light rays to be all reflected towards the non-light transmission part so as to display a dark picture.

21. The control method as claimed in claim 19, wherein the rotation of each of the micro mirrors is controlled to enable the reflected light rays to be at least partially reflected towards the light transmission part so as to display a bright picture.

22. The control method as claimed in claim 21, wherein a ratio of an area that the light rays reflected by each of the micro mirrors are reflected to the light transmission part and an area that the light rays reflected by each of the micro mirrors are reflected to the non-light transmission part is controlled so as to control a gray scale of the bright picture.

23. The control method as claimed in claim 21, wherein a ratio of time that the light rays reflected by each of the micro mirrors are reflected to the light transmission part and time that the light rays reflected by each of the micro mirrors are reflected to the non-light transmission part within certain time is controlled so as to control a gray scale of the bright picture.

24. The control method as claimed in claim 23, wherein the ratio of time that the light rays reflected by each of the micro mirrors are reflected to the light transmission part and time that the light rays reflected by each of the micro mirrors are reflected to the non-light transmission part within certain time is controlled through a pulse width modulation control signal.

25. The control method as claimed in claim 19, wherein the filter is a color filter, the light transmission part at least comprises a first sub-pixel, a second sub-pixel and a third sub-pixel, the non-light transmission part is a black matrix area of a black matrix;

in the micro mirror array assembly, three micro mirrors are arranged corresponding to each pixel unit, the three micro mirrors are arranged corresponding to the first sub-pixel, the second sub-pixel and the third sub-pixel respectively;

in the control method, rotations of the three micro mirrors are controlled respectively so as to control a ratio of light amount of light rays reflected by the three micro mirrors to the first subpixel, light amount of light rays reflected by the three micro mirrors to the second sub-pixel and light amount of light rays reflected by the three micro mirrors to the third sub-pixel respectively.

* * * * *